US006350301B1

(12) United States Patent
Schöllkopf

(10) Patent No.: US 6,350,301 B1
(45) Date of Patent: Feb. 26, 2002

(54) HOUSING-FREE MAINTENANCE UNIT

(75) Inventor: Horst Schöllkopf, Stuttgart (DE)

(73) Assignee: J. Lorch Gesellschaft & Co. GmbH, Waldenbuch (DE)

(*) Notice: Subject to any disclaimer, the term of this patent is extended or adjusted under 35 U.S.C. 154(b) by 0 days.

(21) Appl. No.: 09/552,514

(22) Filed: Apr. 19, 2000

(30) Foreign Application Priority Data

Apr. 28, 1999 (DE) ........................................ 199 19 228

(51) Int. Cl.[7] .......................... B01D 35/14; B01D 35/30

(52) U.S. Cl. ............................ 96/189; 96/190; 96/417; 55/318; 55/DIG. 17

(58) Field of Search .......................... 55/315, 318, 482, 55/DIG. 17; 96/188, 189, 190, 417; 285/93, 363

(56) References Cited

U.S. PATENT DOCUMENTS

| | | | | |
|---|---|---|---|---|
| 3,863,666 A | | 2/1975 | Bonné | |
| 4,061,476 A | * | 12/1977 | Holter et al. | 55/479 |
| 4,456,168 A | | 6/1984 | Laakaniemi | |
| 5,605,360 A | * | 2/1997 | Kurisaki et al. | 285/93 |
| 6,080,228 A | * | 6/2000 | Okada et al. | 96/189 |

FOREIGN PATENT DOCUMENTS

| | | |
|---|---|---|
| DE | 36 06 953 | 9/1987 |
| DE | 40 32 515 | 4/1992 |
| DE | 195 06 472 | 1/1996 |
| DE | 197 35 267 | 4/1999 |
| FR | 2 721 663 | 12/1995 |
| GB | 2 206 504 | 1/1989 |
| WO | WO 96 38 671 | 12/1996 |

* cited by examiner

*Primary Examiner*—Robert A. Hopkins
(74) *Attorney, Agent, or Firm*—Paul Vincent

(57) ABSTRACT

The invention concerns a maintenance unit for compressed air with at least two connecting pieces, wherein the maintenance unit is formed without a housing, in that the connecting pieces can be inserted into or disposed onto the free pipe ends transporting the compressed air.

4 Claims, 1 Drawing Sheet

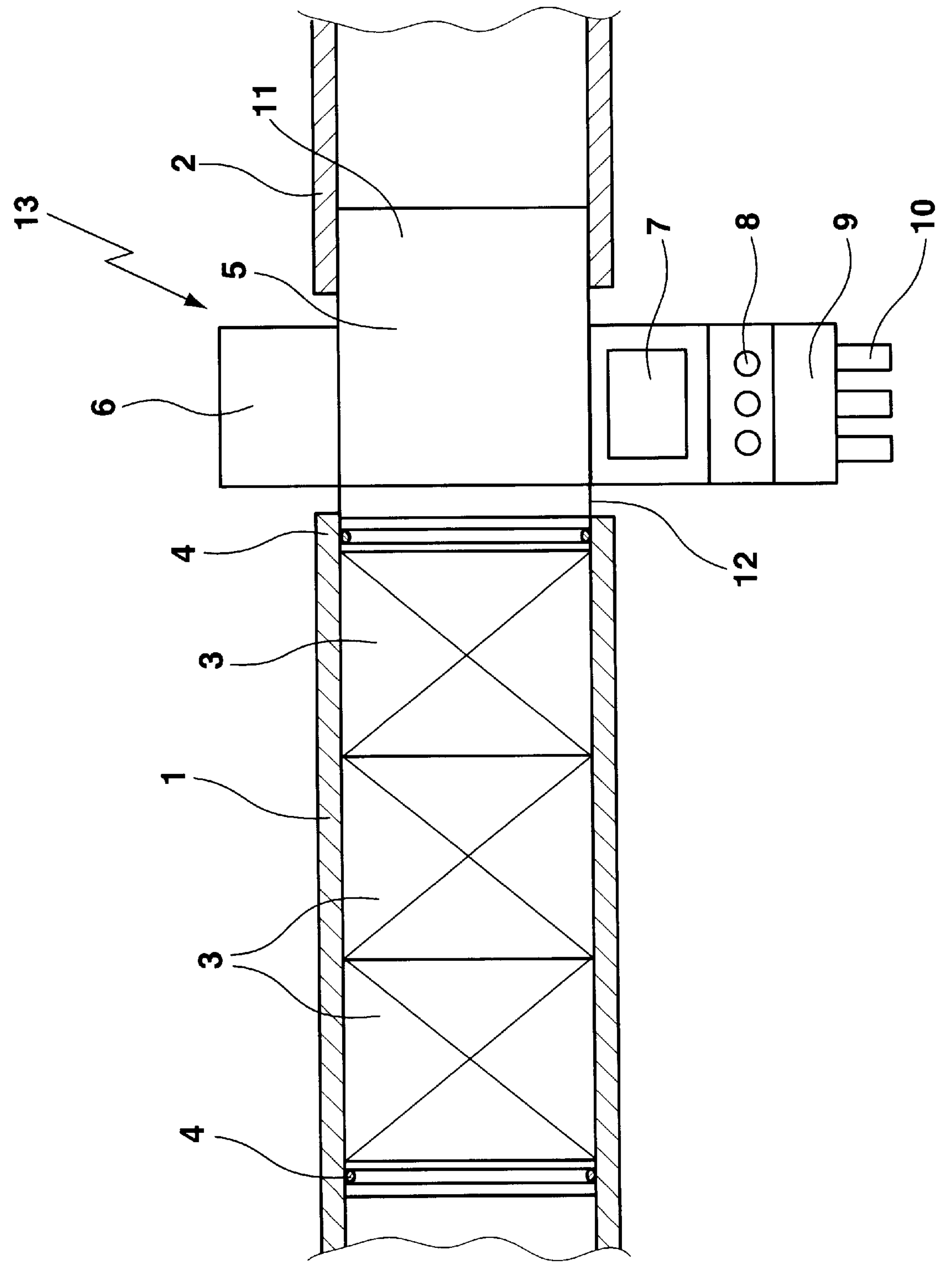
13
2
11
5
6
7
8
9
10
4
12
3
1
3
4

HOUSING-FREE MAINTENANCE UNIT

This application claims Paris Convention priority of DE 199 19 228 filed Apr. 28, 1999 the complete disclosure of which is hereby incorporated by reference.

BACKGROUND OF THE INVENTION

The invention concerns a maintenance unit for the treatment of compressed air.

A plurality of maintenance units are known in the art. WO-A-96 38 671 discloses a maintenance unit comprising several modules. The compressed air is treated in each of the modules. The modules comprise e.g. filters, regulators, dehumidifiers, lubricators etc., wherein each module has its own housing and the modules communicate with another via corresponding connections. Maintenance units of this kind are robust, but require a relatively large amount of space.

It is the underlying purpose of the invention to provide a maintenance unit which requires little space.

SUMMARY OF THE INVENTION

This object is achieved in accordance with the invention by a housing-free maintenance unit for treating compressed air which comprises at least two connecting pieces which can be inserted into or pushed onto the free ends of compressed air transporting pipes and which comprises a flange disposed between the two connecting pieces for additional external devices, wherein the operating elements of the maintenance unit are disposed, without a housing, within the connecting pieces and the flange.

The maintenance unit in accordance with the invention does not have a housing and the space it would require is thereby saved. The operating elements are inserted directly into the pipe ends such that the pipe ends form the housing for the operating elements.

BRIEF DESCRIPTION OF THE DRAWING

The sole FIGURE schematically illustrates the maintenance unit in accordance with the invention.

DESCRIPTION OF THE PREFERRED EMBODIMENT

Sealed connection of the pipes 1, 2 to the maintenance unit 13 is effected via suitable sealing elements 4, e.g. O-rings or by shrinking the connecting pieces onto the pipe ends. Leak-tight glueing, galvanizing or the like are also feasible. In any event, the operating elements 3 of the maintenance unit 13 with which the air is treated are disposed within the pipe ends 1, 2 or in a section located between two pipe ends.

The maintenance unit 13 in accordance with the invention can also be modular, wherein individual modules 3 are inserted, one after the other, into the pipe ends 1, 2.

In a further development, the flange 5 is adapted for connecting a supply container 6, a regulator 8, a display 7, an input 9, pneumatic or electrical connections 10 or the like.

The maintenance unit 13 can be accessed via the flange 5 for reading the measured values, for adjusting the maintenance unit 13, for setting the maintenance unit 13 via input units 9 (e.g. a keyboard, adjustable elements or the like) for supplying oil, or for discharging water. A first connector 12 joins the flange 5 to one pipe end 1 and a second connector 11 joins the flange 5 to the other pipe end 2.

The maintenance unit 13 in accordance with the invention is substantially smaller, relatively inconspicuous and can be installed, e.g. directly at the user end, into the corresponding compressed air pipe.

LIST OF REFERENCE NUMBERS

1 pipe end
2 pipe end
3 operating element
4 O-ring
5 flange
6 supply container
7 display
8 regulator
9 input unit
10 connections
11 first connector
12 second connector
13 maintenance unit

I claim:

1. A housing-free maintenance unit for compressed air transported in a first pipe section, having a first free end and in a second pipe section having a second free end, spaced apart from and facing said first free end, the maintenance unit comprising:

- a first connecting piece for one of insertion into and displacement on said first free end;
- a second connecting piece for one of insertion into and displacement on said second free end;
- a flange disposed between said first and said second connecting piece, said flange accommodating at least one auxiliary device, wherein said at least one auxiliary device comprises a regulator disposed on said flange for external access thereto; and
- maintenance unit operating elements, wherein at least one of said operating elements is structured and dimensioned to fit and function, without a housing, within one of the first pipe section and the second pipe section, wherein said at least one of said operating elements is in electrical communication with said regulator.

2. The maintenance unit of claim 1, wherein said first and said second connecting pieces are shaped for reception by or insertion into circular pipes.

3. The maintenance unit of claim 1, wherein said flange is shaped for connecting at least one of a supply container, a display, an input unit, pneumatic or electrical connections and a collecting container.

4. The maintenance unit of claim 1, wherein the first and second free ends form a housing for said operating elements.

* * * * *